*T. Clinton, G.H. & E.H. Knight,*
*Lifting Jack.*
N° 7,135.    Patented Mar. 5, 1850.
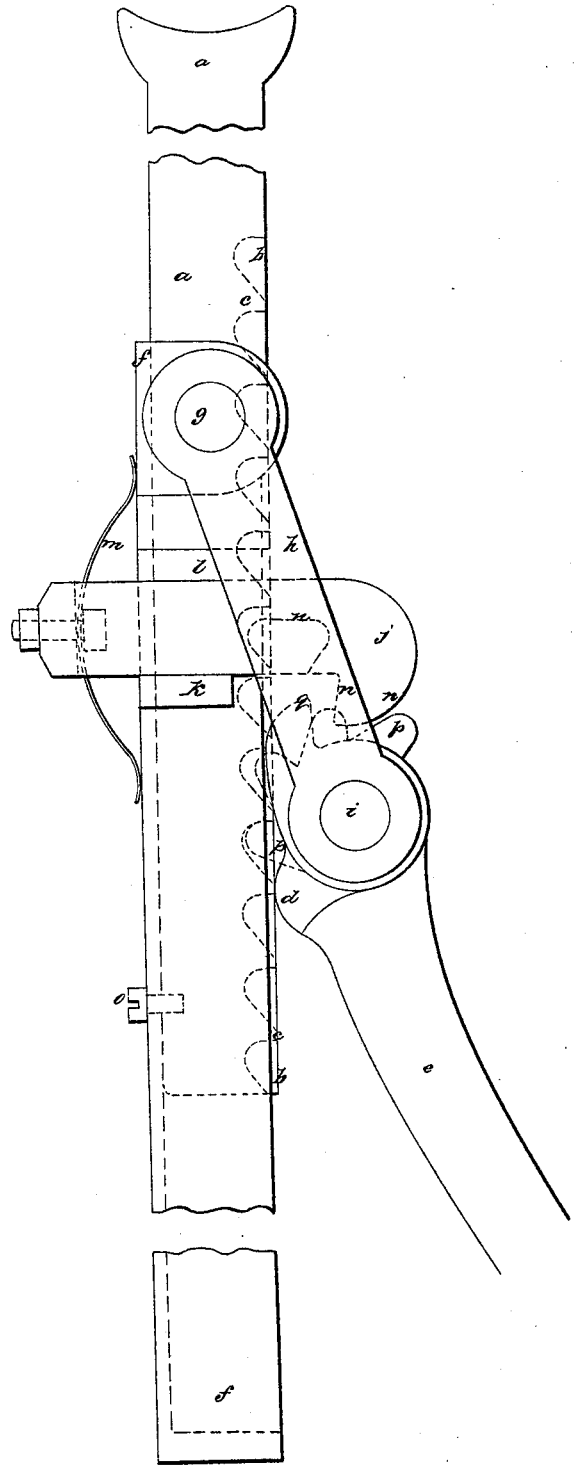

UNITED STATES PATENT OFFICE.

THOMAS G. CLINTON, GEORGE H. KNIGHT, AND EDWARD H. KNIGHT, OF CINCINNATI, OHIO.

CARRIAGE-JACK.

Specification of Letters Patent No. 7,135, dated March 5, 1850.

*To all whom it may concern:*

Be it known that we, THOS. G. CLINTON, GEO. H. KNIGHT, and ED. H. KNIGHT, of Cincinnati, Hamilton county, Ohio, have invented new and useful Improvements in Lever-Jacks; and we do hereby declare the following to be a full, clear, and exact description of the same, reference being had to the annexed drawing, making a part of this specification, in which drawing the several parts of a lever jack constructed on our improved plan are clearly shown.

It has been and is an objection with those who are compelled to resort continually to the use of hoisting jacks that the rack and lever jack which is the simplest and cheapest, is most difficult to let down or be released from its load. As at present made this operation is effected by making the lever take the load with one hand, while the spring catch is withdrawn by the other, and the rack lowered at farthest not more than two teeth at a time, when the catch must again take the load, while the lever is made ready for another lowering of the jack the distance of two more teeth.

The nature of our invention consists in enabling the rack to be lowered without resorting to such a series of slow and troublesome operations as those aforementioned, and this we effect by a combination of parts which are so devised that the tooth of the catch is released and then removed from its field of action by throwing down the lever which is thus and first made to take the load, then retract the catch and then by cams suitably located on the underside of the lever, bring adequate friction to bear upon ways, cast on each side the teeth of the rack; against which friction or resistance the loaded rack forces its descent and gradually falls home.

In the drawing hereunto annexed (*a*) is the rack having ways (*b*) cast on each side the teeth (*c*) thereof, and on which ways the cams (*d*) on the lever (*e*) bear or press at a suitable stage of the consecutive actions of the jack.

(*f*) is the casing of the rack (*g*) journals on the casing (*h*) shackles playing on journals (*g*) at their upper ends and at their lower ends on journals (*i*) cast on the lever (*e*).

(*j*) is the frame of the catch resting on projections (*k*) cast on the casing, which projections in connection with those (*l*) above the frame of the catch, serve as guides and stays to the same (*m*) is the spring for the catch inserted between the back of the catch frame and the casing of the rack.

(*n*) is the tooth of the catch, (*o*) is the guide pin that plays up and down in a slot in the back of the casing and holds the rack to its proper place.

(*p*) are the teeth on the lever (*e*) for operating the rack.

(*q*) are the prongs or lugs which are made at a suitable period to come into contact with the projections (*r*) depending from the sides of the frame of the catch.

Viewing the drawing as a diagram it will readily be seen that the lowest tooth on the lever is in contact with a tooth of the rack, and that the cam on the lever is just ready to force out the tooth of the lever from the tooth of the rack, the tooth of the lever having already released the spring catch from its load and forced it partially out by means of the incline plane of the upper side of the tooth coming into contact with the lower side of the tooth of the spring catch. It will also be perceived that the bite between the teeth of the rack and lever at this juncture in contact is about equal to the distance between the prong on the lever and the projection pendant from the sides of the catch frame. Therefore by the time the tooth on the lever is released from the tooth of the rack the cam will have put great pressure upon the ways of the rack the prong will have reached the pendant projection, and as the cam is drawn forward on the ways by lowering the lever still farther the prong will carry the tooth of the catch beyond the reach of the rack.

Having thus fully clearly and exactly described and represented the nature construction and operation of our improvements in carriage or lever jacks, what we claim therein as new and desire by Letters Patent is—

Constructing the lever (*e*) or its equivalent, with teeth (*p*) prongs (*q*) and cams (*d*), or their equivalents, in such juxtaposition, the one with regard to the other, that when it is necessary to release the rack from its load, these parts of the lever appropriately unite in action with the teeth (*c*) and the ways (*b*) of the rack (*a*) or their equivalents, and with the pendants (*r*) and the tooth (n) of the catch (j) or their equivalents, to take the load off and release the catch, retract and make the frame of the catch a fixed point of resistance for the prongs of the lever, force out the lever tooth from the rack tooth (the cam the while putting pressure upon the ways of the rack) and oppose by the cams, the requisite friction and consequently resistance to the descent of the rack, the whole being arranged substantially in the manner and for the purpose set forth.

THOS. G. CLINTON.
GEO. H. KNIGHT.
EDWARD H. KNIGHT.

Witnesses:
HOSEA H. HUNTLEY,
J. H. ATKINSON.